US012452602B2

(12) United States Patent
Zhang

(10) Patent No.: US 12,452,602 B2
(45) Date of Patent: Oct. 21, 2025

(54) COAXIAL SPEAKER

(71) Applicant: AAC Microtech (Changzhou) Co., Ltd., Jiangsu (CN)

(72) Inventor: Chao Zhang, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 186 days.

(21) Appl. No.: 18/533,100

(22) Filed: Dec. 7, 2023

(65) Prior Publication Data

US 2024/0406635 A1 Dec. 5, 2024

Related U.S. Application Data

(63) Continuation of application No. PCT/CN2023/097398, filed on May 31, 2023.

(51) Int. Cl.

| | |
|---|---|
| ***H04R 9/02*** | (2006.01) |
| ***H04R 7/18*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 7/18* (2013.01); *H04R 9/045* (2013.01); *H04R 9/06* (2013.01); *H04R 2400/11* (2013.01)

(58) Field of Classification Search

CPC .......... H04R 9/025; H04R 7/18; H04R 9/045; H04R 9/06; H04R 2400/11; H04R 9/063; H04R 1/24

See application file for complete search history.

(56) References Cited

FOREIGN PATENT DOCUMENTS

CN 113099365 A * 7/2021 ............... H04R 7/04

* cited by examiner

*Primary Examiner* — Tuan D Nguyen

(74) *Attorney, Agent, or Firm* — Wiersch Law Group

(57) ABSTRACT

A coaxial speaker is disclosed. The coaxial speaker includes two sounding units and a magnetic circuit system including a lower plate, two first magnets arranged on the lower plate and spaced along a long axis, a first yoke arranged on the two first magnets, and a second magnet and two third magnets arranged on the first yoke and between the two first magnets. The two third magnets are arranged on both sides of the second magnet along a short axis. The lower plate has a through hole arranged between the two first magnets and extends two side walls along the long axis. The two side walls together with the two first magnets and the two third magnets form a first gap. The second magnet and the two third magnets form a second gap. The coaxial speaker reduces the product height and has a compact overall structure.

6 Claims, 3 Drawing Sheets

A-A

B-B

COAXIAL SPEAKER

FIELD OF THE PRESENT DISCLOSURE

The present disclosure relates to electroacoustic transducers, in particular to a coaxial speaker.

DESCRIPTION OF THE RELATED ART

A coaxial speaker is a speaker with both a high-frequency sounding unit and a low-frequency sounding unit, and the high-frequency sounding unit and the low-frequency sounding unit are coaxially arranged. The high-frequency sounding unit and the low-frequency sounding unit of the coaxial speaker can be located together on the front side of the coaxial speaker, or can be respectively located on the front and back sides of the coaxial speaker.

A coaxial speaker in the related art, each of the high-frequency sounding unit and the low-frequency sounding unit has an individual and separate magnetic circuit system, however the two magnetic circuit systems are stacked in the product height direction of the coaxial speaker, resulting in an excessive stacking height and reducing the product applicability.

Thus, it is necessary to provide a novel coaxial speaker to solve the problem.

SUMMARY

An objective of the present disclosure is to overcome the above technical problems and provide a coaxial speaker which reduces the product height and has a compact overall structure.

In order to achieve the objective mentioned above, the present disclosure discloses a coaxial speaker including a first sounding unit, a second sounding unit arranged coaxially with the first sounding unit, a first frame, a magnetic circuit system, and a second frame. The first sounding unit includes a first diaphragm and a first voice coil driving the first diaphragm for vibrating and sounding towards the front of the coaxial speaker. The second sounding unit includes a second diaphragm and a second voice coil driving the second diaphragm for vibrating and sounding towards the back of the coaxial speaker. The magnetic circuit system and the first diaphragm are fixed to the first frame. The magnetic circuit system includes a lower plate, two first magnets arranged on a surface of the lower plate close to the first diaphragm and spaced side-by-side along a long axis of the coaxial speaker, a first yoke arranged on surfaces of the two first magnets close to the first diaphragm, a second magnet arranged on a surface of the first yoke far away from the first diaphragm, two third magnets arranged on the surface of the first yoke far away from the first diaphragm and on both sides of the second magnet along a short axis of the coaxial speaker, a second yoke arranged on a surface of the second magnet far away from the first diaphragm, and two third yokes arranged on surfaces of the two third magnets far away from the first diaphragm. The second magnet and the two third magnets are arranged between the two first magnets. The lower plate is provided with a through hole arranged between the two first magnets. The second frame is arranged at the through hole and fixed to the magnetic circuit system. The second diaphragm is fixed to the second frame. The lower plate is further provided with two side walls extending along the long axis of the coaxial speaker and arranged opposite to each other. The first voice coil is arranged in a first gap formed by the two side walls together with the two first magnets and the two third magnets. The second voice coil is arranged in a second gap formed by the second magnet and the two third magnets.

As an improvement, the first sounding unit further includes two first flexible circuit boards spaced apart from the first diaphragm and arranged on both sides of the first voice coil along the long axis of the coaxial speaker. Each first flexible circuit board is connected between the first voice coil and the first frame.

As an improvement, the second sounding unit further includes two second flexible circuit boards spaced apart from the second diaphragm and arranged on both sides of the second voice coil along the long axis of the coaxial speaker. Each second flexible circuit board is connected between the second voice coil and the second frame.

As an improvement, the second diaphragm is flush with a surface of the lower plate far away from the first diaphragm.

As an improvement, the second frame includes a ring body part and a plurality of extension parts extending from the ring body part towards the first yoke. The ring body part abuts against an inner wall of the lower plate enclosing the through hole. The plurality of extension parts abuts against the first yoke.

As an improvement, each third magnet is sandwiched between two corresponding extension parts.

In the coaxial speaker according to the present disclosure, the two first magnets are spaced side-by-side along the long axis of the coaxial speaker, the second magnet and the two third magnets are arranged between the two first magnets, the two third magnets are arranged on both sides of the second magnet along the short axis of the coaxial speaker, the lower plate is provided with the through hole arranged between the two first magnets, thereby forming a common magnetic circuit system for the first sounding unit and the second sounding unit and solving the technical problem of two magnetic circuit systems stacked in the product height direction, in addition, the space between the two first magnets and the through hole of the lower plate can contain the second sounding unit. Thereby, the coaxial speaker reduces the product height, has a compact overall structure, and improves the product applicability.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
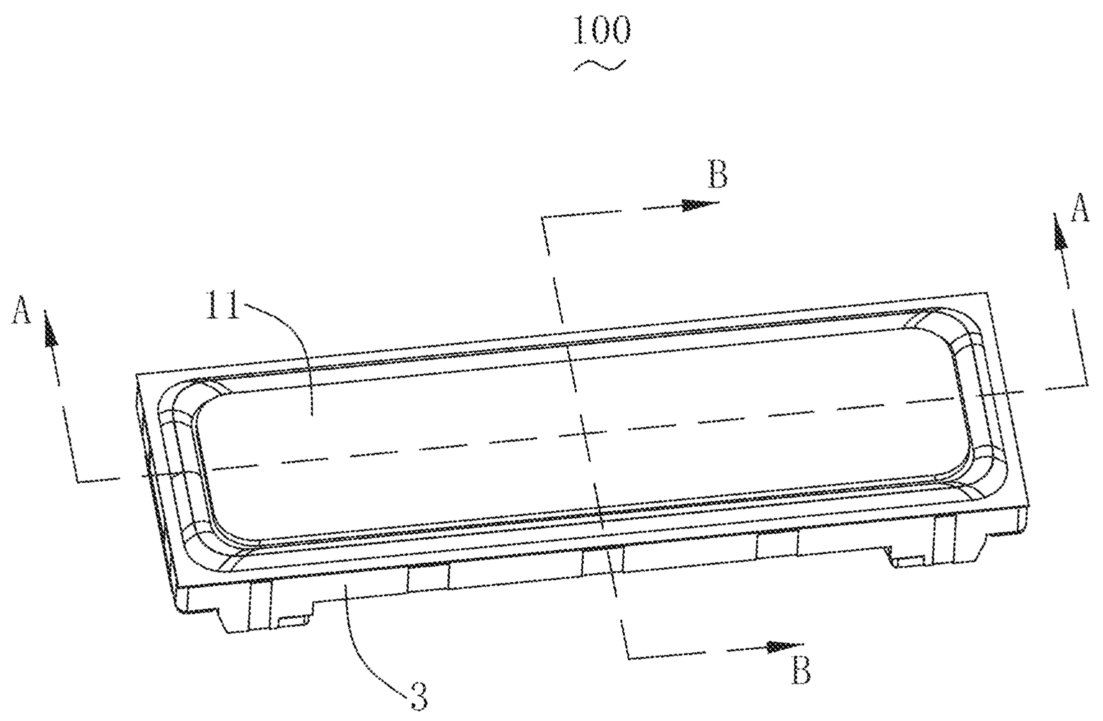
FIG. 1 is an isometric view of a coaxial speaker in accordance with an exemplary embodiment of the present disclosure.
Figure 2:
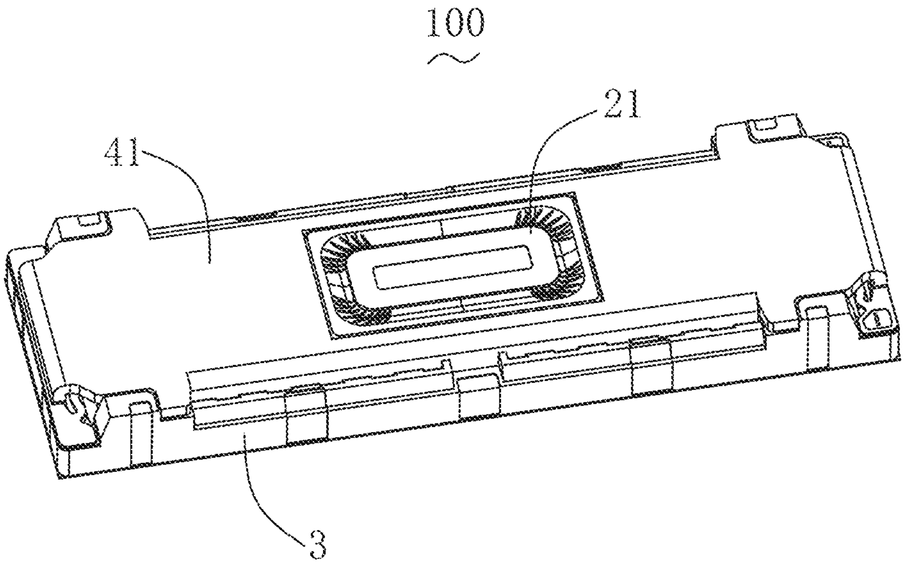
FIG. 2 is another isometric view of the coaxial speaker in FIG. 1, from another aspect.
Figure 3:
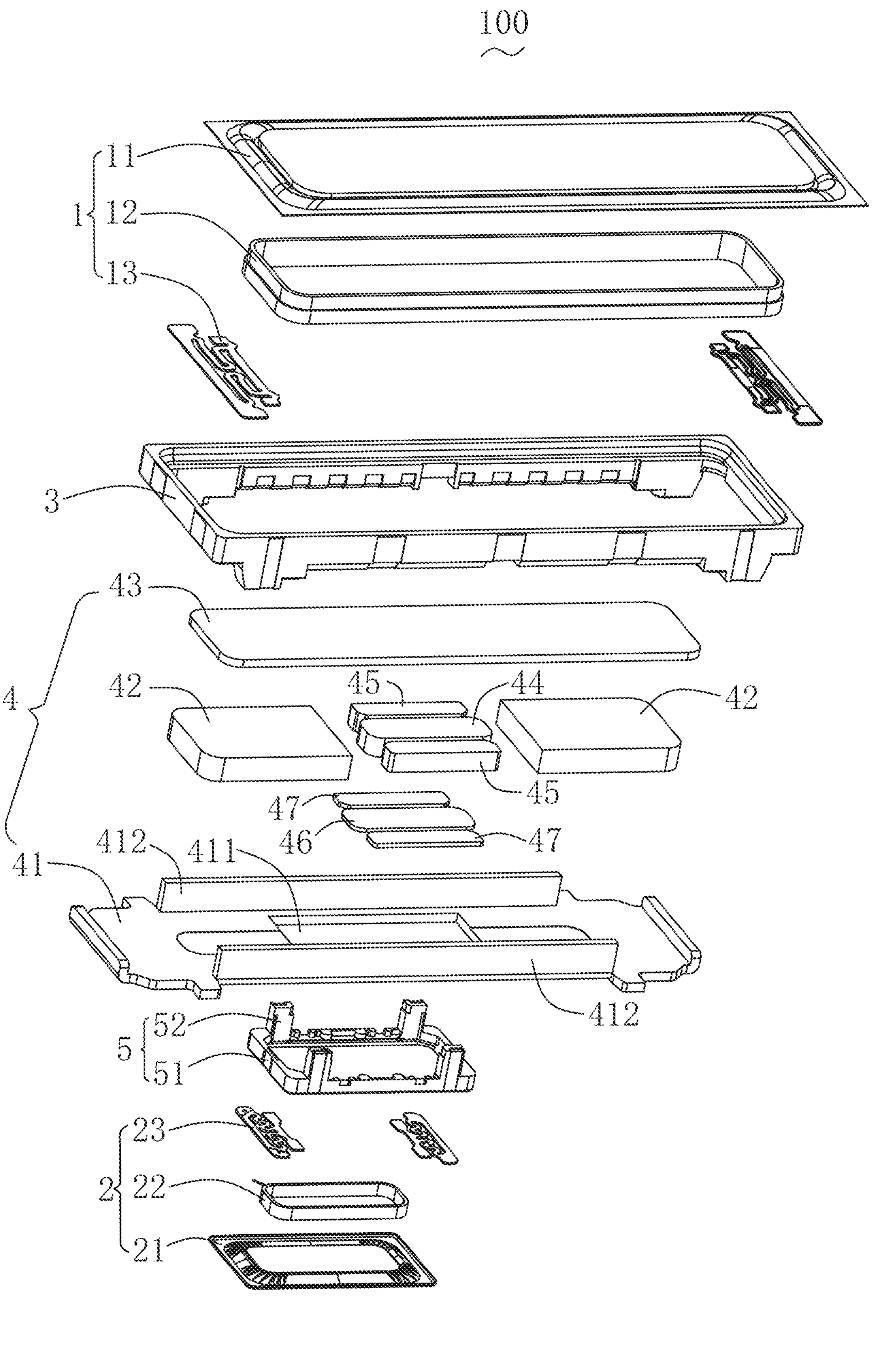
FIG. 3 is an exploded view of the coaxial speaker in FIG. 1.
Figure 4:
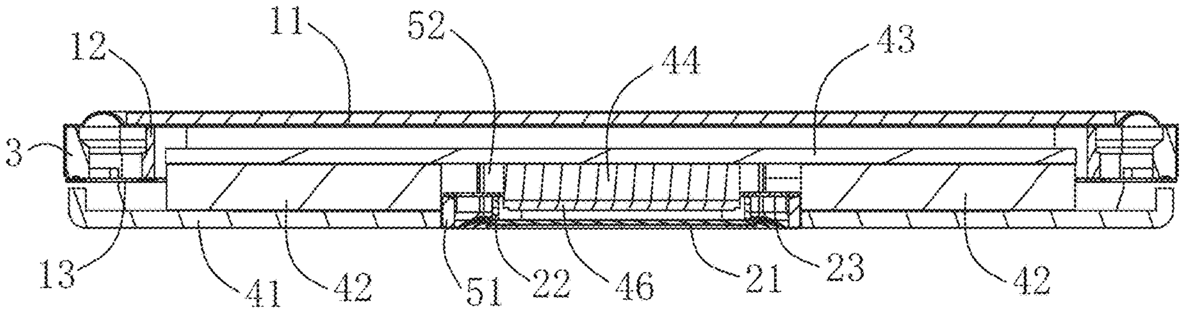
FIG. 4 is a cross-sectional view of the coaxial speaker, taken along line A-A in FIG. 1.
Figure 5:
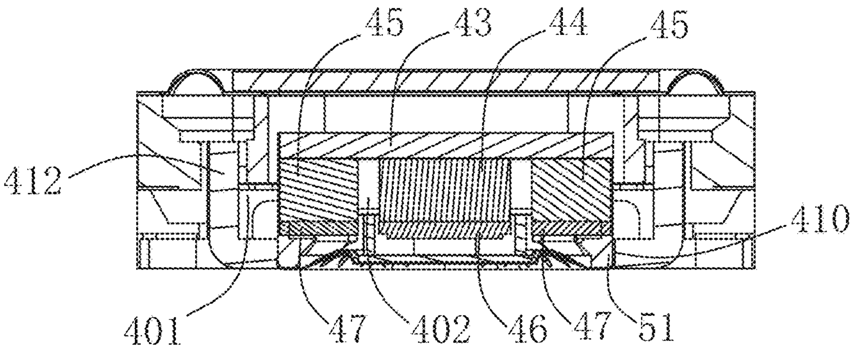
FIG. 5 is a cross-sectional view of the coaxial speaker, taken along line B-B in FIG. 1.

Referring to FIGS. 1-5, the present disclosure discloses a coaxial speaker 100 including a first sounding unit 1, a second sounding unit 2 arranged coaxially with the first sounding unit 1, a first frame 3, a magnetic circuit system 4, and a second frame 5.

The first sounding unit 1 includes a first diaphragm 11 and a first voice coil 12 driving the first diaphragm 11 for vibrating and sounding towards the front of the coaxial speaker 100. The second sounding unit 2 includes a second diaphragm 21 and a second voice coil 22 driving the second diaphragm 21 for vibrating and sounding towards the back of the coaxial speaker 100.

The magnetic circuit system 4 and the first diaphragm 11 are fixed to the first frame 3.

The magnetic circuit system 4 includes a lower plate 41, two first magnets 42 arranged on a surface of the lower plate 41 close to the first diaphragm 11 and spaced side-by-side along a long axis of the coaxial speaker 100, a first yoke 43 arranged on surfaces of the two first magnets 42 close to the first diaphragm 11, a second magnet 44 arranged on a surface of the first yoke 43 far away from the first diaphragm 11, two third magnets 45 arranged on the surface of the first yoke 43 far away from the first diaphragm 11 and on both sides of the second magnet 44 along a short axis of the coaxial speaker 100, a second yoke 46 arranged on a surface of the second magnet 44 far away from the first diaphragm 11, and two third yokes 47 arranged on surfaces of the two third magnets 45 far away from the first diaphragm 11. The second magnet 44 and the two third magnets 45 are arranged between the two first magnets 42. The lower plate 41 is provided with a through hole 411 arranged between the two first magnets 42. The lower plate 41 is further provided with two side walls 412 extending along the long axis of the coaxial speaker 100 and arranged opposite to each other. The first voice coil 12 is arranged in a first gap 401 formed by the two side walls 412 together with the two first magnets 42 and the two third magnets 45. The second voice coil 22 is arranged in a second gap 402 formed by the second magnet 44 and the two third magnets 45.

The second frame 5 is arranged at the through hole 411 and fixed to the magnetic circuit system 4. The second diaphragm 21 is fixed to the second frame 5. Optionally, the second diaphragm 21 is flush with a surface of the lower plate 41 far away from the first diaphragm 11.

The first sounding unit 1 further includes two first flexible circuit boards 13 spaced apart from the first diaphragm 11 and arranged on both sides of the first voice coil 12 along the long axis of the coaxial speaker 100. Each first flexible circuit board 13 is connected between the first voice coil 12 and the first frame 3.

The second sounding unit 2 further includes two second flexible circuit boards 23 spaced apart from the second diaphragm 21 and arranged on both sides of the second voice coil 22 along the long axis of the coaxial speaker 100. Each second flexible circuit board 23 is connected between the second voice coil 22 and the second frame 5.

The second frame 5 includes a ring body part 51 and a plurality of extension parts 52 extending from the ring body part 51 towards the first yoke 43. The ring body part 51 abuts against an inner wall 410 of the lower plate 41 enclosing the through hole 411. The plurality of extension parts 52 abuts against the first yoke 43. Optionally, each third magnet 45 is sandwiched between two corresponding extension parts 52, thereby making the overall structure more compact and reasonable.

In the coaxial speaker 100 according to the present disclosure, the two first magnets 42 are spaced side-by-side along the long axis of the coaxial speaker 100, the second magnet 44 and the two third magnets 45 are arranged between the two first magnets 42, the two third magnets 45 are arranged on both sides of the second magnet 44 along the short axis of the coaxial speaker 100, the lower plate 41 is provided with the through hole 411 arranged between the two first magnets 42, thereby forming a common magnetic circuit system 4 for the first sounding unit 1 and the second sounding unit 2 and solving the technical problem of two magnetic circuit systems stacked in the product height direction, in addition, the space between the two first magnets 42 and the through hole 411 of the lower plate 41 can contain the second sounding unit 2. Thereby, the coaxial speaker 100 reduces the product height, has a compact overall structure, and improves the product applicability.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A coaxial speaker, comprising:

a first sounding unit, comprising a first diaphragm and a first voice coil driving the first diaphragm for vibrating and sounding towards the front of the coaxial speaker;

a second sounding unit arranged coaxially with the first sounding unit, comprising a second diaphragm and a second voice coil driving the second diaphragm for vibrating and sounding towards the back of the coaxial speaker;

a first frame;

a magnetic circuit system; and a second frame;

wherein the magnetic circuit system and the first diaphragm are fixed to the first frame, the magnetic circuit system comprises a lower plate, two first magnets arranged on a surface of the lower plate close to the first diaphragm and spaced side-by-side along a long axis of the coaxial speaker, a first yoke arranged on surfaces of the two first magnets close to the first diaphragm, a second magnet arranged on a surface of the first yoke far away from the first diaphragm, two third magnets arranged on the surface of the first yoke far away from the first diaphragm and on both sides of the second magnet along a short axis of the coaxial speaker, a second yoke arranged on a surface of the second magnet far away from the first diaphragm, and two third yokes arranged on surfaces of the two third magnets far away from the first diaphragm, the second magnet and the two third magnets are arranged between the two first magnets, the lower plate is provided with a through hole arranged between the two first magnets, the second frame is arranged at the through hole and fixed to the magnetic circuit system, the second diaphragm is fixed to the second frame, the lower plate is further provided with two side walls extending along the long axis of the coaxial speaker and arranged opposite to each other, the first voice coil is arranged in a first gap formed by the two side walls together with the two first magnets and the two third magnets, the second voice coil is arranged in a second gap formed by the second magnet and the two third magnets.

2. The coaxial speaker as described in claim 1, wherein the first sounding unit further comprises two first flexible circuit boards spaced apart from the first diaphragm and arranged on both sides of the first voice coil along the long axis of the coaxial speaker, each first flexible circuit board is connected between the first voice coil and the first frame.

3. The coaxial speaker as described in claim 1, wherein the second sounding unit further comprises two second flexible circuit boards spaced apart from the second diaphragm and arranged on both sides of the second voice coil along the long axis of the coaxial speaker, each second flexible circuit board is connected between the second voice coil and the second frame.

4. The coaxial speaker as described in claim 1, wherein the second diaphragm is flush with a surface of the lower plate far away from the first diaphragm.

5. The coaxial speaker as described in claim 1, wherein the second frame comprises a ring body part and a plurality of extension parts extending from the ring body part towards the first yoke, the ring body part abuts against an inner wall of the lower plate enclosing the through hole, the plurality of extension parts abuts against the first yoke.

6. The coaxial speaker as described in claim 5, wherein each third magnet is sandwiched between two corresponding extension parts.

* * * * *